United States Patent [19]

Kokubu

[11] Patent Number: 4,871,909
[45] Date of Patent: Oct. 3, 1989

[54] OPTICAL SWITCH DEVICE EMPLOYING FLUORESCENT SUBSTANCE IN COMBINATION WITH A RADIOACTIVE ELEMENT AS A LIGHT SOURCE

[75] Inventor: Sadao Kokubu, Aichi, Japan

[73] Assignee: Kabushiki Kaisha Tokai Rika Denki Seisakusho, Japan

[21] Appl. No.: 281,848

[22] Filed: Dec. 8, 1988

Related U.S. Application Data

[63] Continuation of Ser. No. 31,089, Mar. 26, 1987, Pat. No. 4,795,900.

[30] Foreign Application Priority Data

Mar. 27, 1986 [JP] Japan .................................. 61-45738
Mar. 31, 1986 [JP] Japan .................................. 61-47611
Mar. 31, 1986 [JP] Japan .................................. 61-47610

[51] Int. Cl.$^4$ ............................. G01D 5/34; H01J 1/56
[52] U.S. Cl. ...................................... 250/229; 341/31; 313/54

[58] Field of Search ............... 250/221, 229, 231 P, 250/231 R; 341/31; 313/54, 498; 362/95, 84, 260; 200/314, 308

[56] References Cited

U.S. PATENT DOCUMENTS

| | | | |
|---|---|---|---|
| 2,959,701 | 11/1960 | Marzocchi et al. | 313/54 |
| 3,056,030 | 9/1962 | Kelchner | 341/31 |
| 3,235,741 | 2/1966 | Plaisance | 250/237 R |
| 3,617,627 | 11/1971 | Mc Lean | 341/31 |
| 4,015,122 | 3/1977 | Rubinstein | 250/221 |
| 4,049,964 | 9/1977 | Wuchinich et al. | 250/229 |
| 4,260,882 | 4/1981 | Barnes | 250/221 |
| 4,652,205 | 3/1987 | Ross et al. | 250/221 |

*Primary Examiner*—David C. Nelms
*Assistant Examiner*—Michael Messinger
*Attorney, Agent, or Firm*—Steele, Gould & Fried

[57] ABSTRACT

This invention relates to an optical switch device including a light spot composed of a fluorescent substance in combination with a radioactive element. A switching signal is obtained from an output from a light detector.

1 Claim, 5 Drawing Sheets

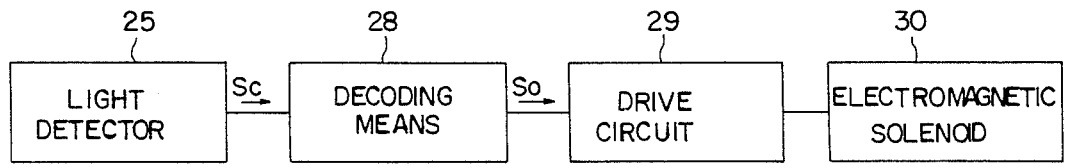
FIG.7
OUTPUT FROM PHOTOTRANSISTOR 25b IN ACCORDANCE WITH LINE 22 OF SLITS
| FIRST ROW | SECOND ROW | THIRD ROW | FOURTH ROW | FIFTH ROW | SIXTH ROW | SEVENTH ROW |
|---|---|---|---|---|---|---|
| 0 | 1 | 0 | 1 | 0 | 1 | 1 |
| 1 | 1 | 0 | 1 | 0 | 1 | 0 |
OUTPUT FROM PHOTOTRANSISTOR 25b IN ACCORDANCE WITH LINE 23 OF SLITS
FIG.8
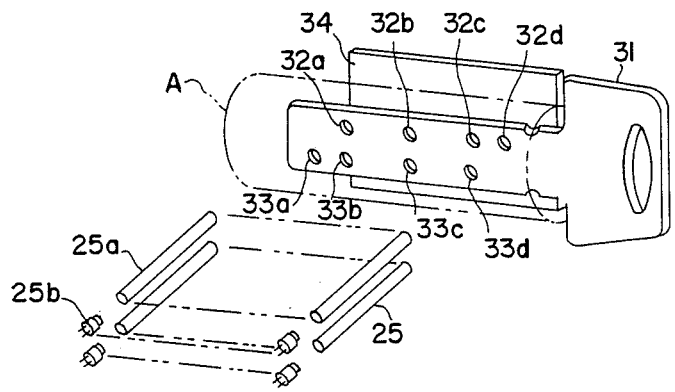
FIG.9

| POSITION OF BRACKET 53 | OUTPUT FROM TERMINAL 57 | OUTPUT FROM TERMINAL 58 |
|---|---|---|
| OFF | 0 | 0 |
| INT | 1 | 0 |
| LO | 0 | 1 |
| HI | 1 | 1 |

OPTICAL SWITCH DEVICE EMPLOYING FLUORESCENT SUBSTANCE IN COMBINATION WITH A RADIOACTIVE ELEMENT AS A LIGHT SOURCE

This is a continuation of co-pending application Ser. No. 031,089 filed on Mar. 26, 1987, now U.S. Pat. No. 4,795,900.

BACKGROUND OF THE INVENTION

1. Field of the Invention

This invention relates generally to an optical switch device wherein switching pattern signals are obtained by allowing and disallowing a light from a light source to impinge on a light detector, and more particularly to the optical switch device wherein a fluorescent substance is employed as the light source.

2. Description of the Prior Art

Switch devices wherein a combination of a light-emitting diode and a phototransistor is utilized have been contemplated to replace the switch devices having switch contacts. For example, in one of such switch devices, a light guiding member formed of a plastic material or an optical fiber provides a light passageway for a light between the light-emitting diode and the phototransistor, and a shutter is moved into and out of the light passageway.

According to the above-described switch device, the light-emitting diode is required to be normally held "on." Thus, the prior art switch device employing the light-emitting diode and the phototransistor has a disadvantage in electric power consumption.

SUMMARY OF THE INVENTION

Therefore, an object of this invention is to provide an optical switch device employing a fluorescent substance as the light source, wherein power consumption is reduced and wherein the construction of the switch device is simplified.

The optical switch device in accordance with this invention comprises a fluorescent substance constantly emitting a fluorescence in combination with a radioactive element, a light guiding member guiding the fluorescence from the fluorescent substance, an operating member selectively allowing the fluorescence to impinge on the light guiding member when displaced, and a light detector provided so as to detect the fluorescence guided by the light guiding member to thereby generate a switching signal.

According to the above-described construction, when the operating member is not displaced, the fluorescence from the fluorescent substance does not impinge on the light guiding member. Accordingly, no switching signal is generated by the light detector. When the operating member is displaced manually or with other means, the fluorescence from the fluorescent substance impinges on the light detector through the light guiding member, whereby the switching signal is generated by the light detector.

The invention is applied to an optical switch device for unlocking automobile doors, which comprises a key inserted into a keyhold for unlocking a door and a light detector detecting light from light spots which constitute key signal codes optically provided by the key. The fluorescent substance is employed as a light source of the light spots. Accordingly, no electric power is required to be supplied to the light source and electrical wiring for the light source is denecessitated.

Furthermore, the invention is applied to a wiper switch, comprising a movable responsive member in which location signal codes comprised of light spots formed of the fluorescent substance, and a light detector provided so as to be opposed to a movement locus of the responsive member so that the light from the light spots is detected when the responsive member passes the light spots.

In the above-described construction, the power supply to the light source is also not required and the electrical wiring is denecessitated.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

In the accompanying drawings:

FIG. 7 is a block diagram showing a signal processing circuit employed in the device in FIG. 5;

FIG. 8 shows code patterns of key signals;

FIG. 9 is a view similar to FIG. 5 showing the switch device of a fourth embodiment;

DESCRIPTION OF PREFERRED EMBODIMENTS

Figure 1:
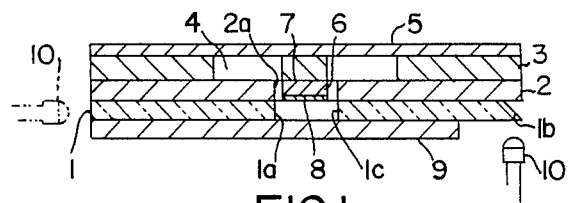
FIG. 1 is a longitudinal section of the optical switch device of a first embodiment in accordance with this invention.
Figure 2:
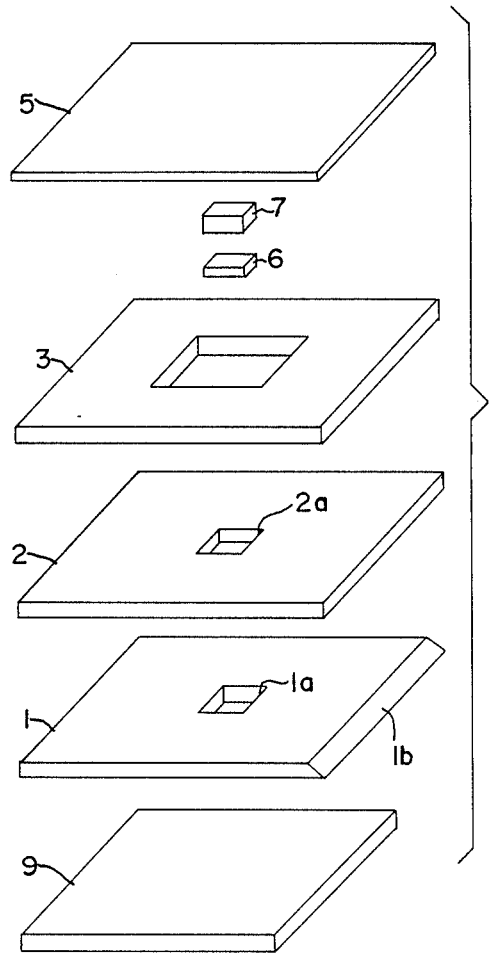
FIG. 2 is an exploded perspective view of the optical switch device in FIG. 1.
Figure 3:
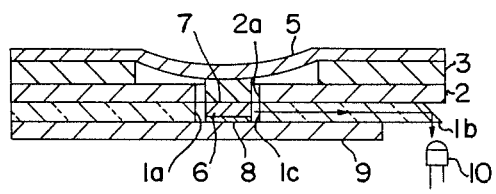
FIG. 3 is a view similar to FIG. 1 showing the optical switch device wherein the operating member is depressed.

First Embodiment (See FIGS. 1-3):

There is shown in FIGS. 1, 2 and 3 the optical switch device of a first embodiment. Referring first to FIGS. 1 and 2, numeral 1 indicates a light guiding member formed of a transparent plastic plate and having a rectangular flat configuration. The light guiding member 1 has a central rectangular opening 1a. As shown in FIGS. 1 and 2, a right-hand edge portion of the light guiding member 1 is cut at an angle of 45° to top and under surfaces thereof so as to serve as a reflecting surface 1b. A light shielding plate 2 is provided on the light guiding member 1. The light shielding plate 2 is formed of a plastic material having a light shielding effect and has the same rectangular configuration as the light guiding member 1. The light shielding plate 2 is provided with a central opening 2a having the same configuration as the opening 1a. A spacer 3 provided on the light shielding plate 2 is formed of a plastic material having a light shielding effect and has a rectangular frame-like configuration and the same outer configuration as the light shielding plate 2. Accordingly, a central space 4 communicates with the openings 1a and 2a. An operating plate 5 provided on the spacer 3 is formed of a plastic film with elasticity. The operating plate 5 has the same outer configuration as the spacer 13.

Numeral 6 indicates a fluorescent substance of a rectangular flat configuration. The fluorescent substance 6 is combined with a radioactive element so as to constantly emit a fluorescence. The fluorescent substance 6 is mounted on a central under surface of the operating plate 5 with a support plate 7 inserted therebetween so that the fluorescent substance 6 is normally positioned within the opening 2a. In this position, an under surface of the fluorescent substance 6 is placed at least above a top surface of the light guiding member 1. Accordingly, the fluorescence emitted from the fluorescent substance 6 does not constantly impinge on the light guiding member 1. A black paint is coated on or a light shielding film is applied to the under surface of the fluorescent substance 6 by means of adhesive or the like to thereby provide a light shielding layer 8. When a top surface of the operating plate 5 is depressed with a finger or the like, the operating plate 5 suffers from elastic deformation as shown in FIG. 3. As the result of elastic deformation of the operating plate 5, the fluorescent substance 6 is displaced into the opening 1a and opposed to an inner peripheral surface of the light guiding member 1, thereby allowing the fluorescence to impinge on the light guiding member 1. When the finger is released, the operating plate 5 returns to the normal state shown in FIG. 1. An under surface of the light guiding member 1 except part opposed to the reflecting surface 1b is covered with a rectangular opaque reinforcement 9.

A phototransistor 10 as a light detector is placed below the reflecting surface 1b in opposed relation thereto. When the fluorescence from the fluorescent substance 6 impinges on the light guiding member 1, the fluorescence is reflected on the reflecting surface 1b to be detected by the phototransistor 10. When the fluorescence is detected by the phototransistor 10, it generates switching signals.

The light guiding member 1, light shielding plate 2, the spacer 3, the operating plate 5 and the reinforcement 9 are fixed by means of adhesive or for tholding peripheral edges thereof.

According to the above-described arrangement, in normal condition, that is, when the operating plate 5 does not suffer from elastic deformation, the fluorescent substance 6 is not opposed to the inner peripheral surface 1c of the light guiding member 1. Consequently, since the fluorescence from the fluorescent substance 6 does not impinge on the phototransistor 10, the switching signals are not generated. When the central top surface of the operating plate 5 is depressed, the fluorescent substance 6 is displaced to be opposed to the inner peripheral surface 1c of the light guiding member 1 as shown in FIG. 3. As shown by arrow in FIG. 3, the fluorescence from the fluorescent substance 6 is guided through the light guiding member 1 and reflected on the reflecting surface 1b to be detected by the phototransistor 10. Thus, while the central top surface of the operating plate 5 is being depressed, the switching signals are generated by the phototransistor 10. When the operating plate 5 is returned to the normal state shown in FIG. 1, the switching signals are not generated.

In the optical switch device of the first embodiment, the fluorescent substance 6 combined with the radioactive element is employed as the light source. Electric consumption is reduced when the switch device of this embodiment is compared with the prior art optical switch devices wherein the light-emitting diode is employed as the light source. Furthermore, a light passageway is provided only by the light guiding member 1 and each of the light guiding member 1, the light shielding plate 2, the spacer 3, the operating plate 5 and the reinforcement 9 is formed into a simple configuration and produced at low cost. These members are stacked one upon another, so that the optical switch device of the embodiment has a simple construction and the production cost thereof is decreased. Additionally, since the movable portion of the switch device also has a simple arrangement, the switch device is rendered small-sized and thinner as compared with the prior art optical switch devices. The abovementioned parts are produced by means of press, so that the productivity of the switch device is highly improved. Furthermore, the invention can be applied to a multi-switch device by changing the configuration of the light guiding member 1 and the light shielding plate 2. The switch device of this invention thus has an advantage in wider fields of application.

Although the light guiding member 1 has the reflecting surface 1b, it may be eliminated. For example, the reflecting surface 1b is denecessitated where the phototransistor 10 is placed as shown by alternate long and two short dashes line in FIG. 1. Furthermore, the light guiding member 1 may be a hollow member.

Figure 4:
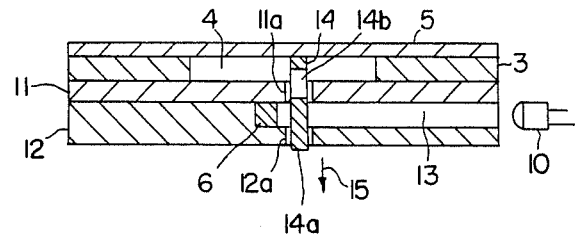
FIG. 4 is a view similar to FIG. 1 showing the switch device of a second embodiment.

Second Embodiment (See FIG. 4):

In a second embodiment, identical parts are labelled by the same reference numerals as those in the first embodiment. Referring to FIG. 4, a space defined by two light shielding plates 11 and 12 serves as a light passageway 13. The phototransistor 10 is provided in the vicinity of an outer end portion of the light passageway 13 so that the fluorescence from the fluorescent substance 6 is guided through the light passageway 13 and that the fluorescence guided by the light passageway 13 is detected by the phototransistor 10. The fluorescent substance 6 is provided at the inner end of the light passageway 13. A movable member 14 provided on the under surface of the operating plate 5 extends through slits 11a and 12a formed in the light shielding plates 11 and 12 respectively. The movable member 14 includes a shutter portion 14a and an opening 14b. When the operating plate 5 is not depressed, the shutter portion 14a of the movable member 14 is positioned within the light passageway 13 and the opening 14b is positioned outside the light passageway 13.

In operation of the device of the second embodiment, when the operating plate 5 is not depressed as shown in FIG. 4, the fluorescence from the fluorescent substance 6 is blocked by the shutter portion 14a of the movable member 14. Accordingly, the fluorescence from the fluorescent substance 6 is not detected by the phototransistor 10. When the operating plate 5 is depressed, the movable member 14 is moved in the direction of arrow 15 in FIG. 4. With the movement of the movable member 14, the shutter portion 14a is moved outside the light passageway 13 and the opening 14b is moved into the light passageway 13. The fluorescence from the fluorescent substance 6 passes through the opening 14b to be detected by the phototransistor 10. Thus, the switching signals are generated.

Figure 5:
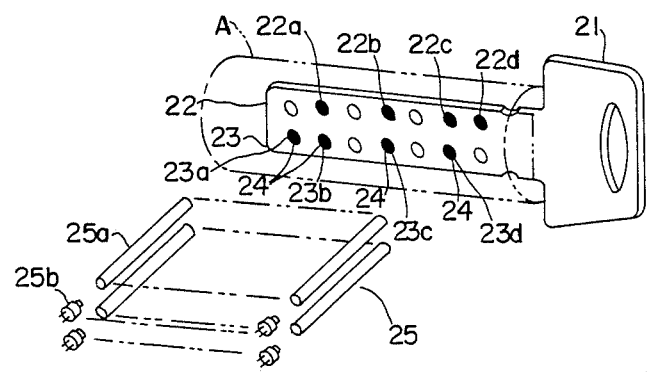
FIG. 5 is an exploded perspective view of the switch device for key unlocking of a third embodiment.

Third Embodiment (See FIGS. 5-8):

FIGS. 5-8 show a third embodiment wherein the invention is applied to a door unlocking switch device for automobiles. Referring to FIG. 5, numeral 21 indicates a key, which is inserted into and pulled out of a keyhold (not shown) formed in a rotor A. Two lines 22 and 23 of seven slits are formed in the lengthwise direction of the the key 21 so that key signal codifying light spots are provided. Each of the lines 22 and 23 is comprised of, for example, seven slits. Each slit serves as a codified signal generating point. In the lines, predetermined slits are employed at photo-signal generating slits 22a-22d and 23a-23d respectively. For example, in this embodiment, second, fourth, sixth and seventh slits in the line 22 and first, second, fourth and sixth slits in the line 23 are employed as the photo-signal generating slits. A fluorescent substances 24, each of which constantly emits a fluorescence in combination with a radioactive element, is embedded within the photo-signal generating slits 22a-22d and 23a-23d. Accordingly, the fluorescence is constantly emitted through each of the slits 22a-22d and 23a-23d. Many kinds of keys are made by changing the location and number of photo-signal generating slits. One of the first row of slits is used as the photo-signal generating slit to discriminate between obverse and back of the key 21.

A light detector 25 is provided at one side of the rotor A. The light detector 25 comprises fourteen optical fibers 25a and fourteen phototransistors 25b. When the key 21 is inserted into the keyhold, distal end surfaces of the optical fibers 25a are opposed to the lines 22 and 23 of slits respectively. The phototransistors 25b are provided in opposite relation to rear end surfaces of the optical fibers 25b respectively.

Figure 6:
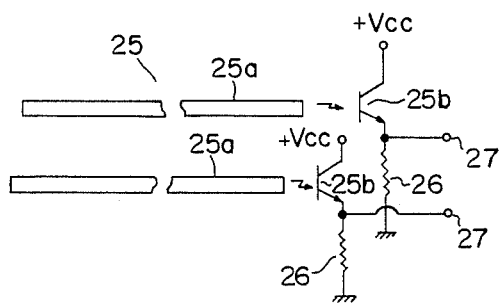
FIG. 6 is a circuit diagram employed in the device in FIG. 5.

A shown in FIG. 6, a collector of each phototransistor is connected to a power-supply terminal +Vcc and an emitter thereof is grounded through a resistance 26. When each phototransistor 25a detects the fluorescence from corresponding fluorescent substance 24, a logic level "1" signal is supplied from corresponding output terminals 27. That is, when the key 21 is inserted into the keyhold, the fluorescence from each fluorescent substance 24 impinges, through each of the photo-signal generating slits 22a-22d and 23a-23d, on corresponding phototransistor 25b, which generates a codified signal Sc composed of logic signal in accordance with a codified arrangement set on the key 21. More concretely, where the photo-signal generating slits 22a-22d and 23a-23d are set as shown in FIG. 5, each photo-transistor 25a corresponding to each of the first to seven slits of the lines 22 and 23 generates a codified signal Sc. In this case, a combination of the codified signals Sc is shown in FIG. 8.

FIG. 7 schematically shows a manner of processing the codified signals Sc. Numeral 28 indicates a means for decoding the codified signals Sc. The codified signals Sc are supplied to the decoding means 28 from the photo-transistors 25a. A door unlock signal So is generated from the decoding means 28 when the codified signals Sc coincide with preset codified signals. Based on the first row of the codified signals Sc supplied, which correspond to the codes of the first row in FIG. 8, the decoding means 28 discriminates between obverse and back of the key 21. The result of discrimination is utilized for the decoding of the codified signals Sc in the decoding means 28.

Numeral 29 indicates a drive circuit which is supplied with the door unlocking signal from the decoding means 28. When supplied with the door unlocking signal So, the drive circuit 29 operates to drive an electromagnetic solenoid 30 as a door unlocking means. Drive of the electromagnetic solenoid 30 causes the rotor A to rotate, whereby the key is turned.

According to the third embodiment, since the fluorescent substances 24 are employed as light source for generating the codified signals, consumption of electric power is reduced as compared with the prior art optical switch device wherein the light source is required to be always supplied with electric power. Accordingly, when the switch device of the third embodiment is mounted in the automobile, a battery is prevented from being over-discharged. Furthermore, since relatively expensive light source and electrical wiring for the light source are denecessitated, the production cost of the switch device is decreased and the assembly work of the switch device is simplified. Furthermore, the light source is not provided at the side of the rotor A. The light source for the phototransistors is first provided when the key 21 is inserted into the keyhold.

Although the photo-signals from the key 21 are processed in a static manner by disposing the fourteen phototransistors 25b in accordance with the fourteen slits of the lines 22 and 23, the photo-signals may be processed in a dynamic manner. In this case, based on the output from each of two phototransistors for the lines 22 and 23 of the slits, the photo-signals from the key 21 are processed. The output from the phototransistor varies in time series when the key is inserted into the keyhold.

Fourth Embodiment (See FIG. 9):

FIG. 9 shows the switch device of a fourth embodiment, in which the same effect can be obtained as in the third embodiment. Numeral 31 indicates a key on which photo-signal generating slits 32a-32d and 33a-33d provided in accordance with a predetermined codified arrangement are formed in the lengthwise direction thereof. A fluorescent substance 34 having a rectangular flat configuration is provided so that when the key 31 is inserted into the keyhold, the fluorescent substance 34 is opposed to the light detector with the key positioned therebetween. When the key 31 is inserted into the keyhold, the fluorescence from the fluorescent substance 34 is detected through the slits 32a-32d and 33a-33d by the light detector 25.

Figure 10:
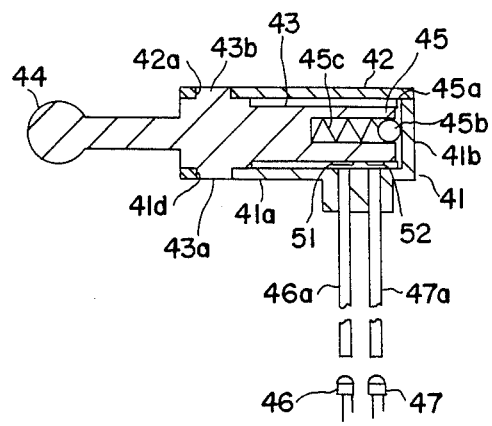
FIG. 10 is a sectional view of the wiper switch device of a fifth embodiment.
Figure 11:
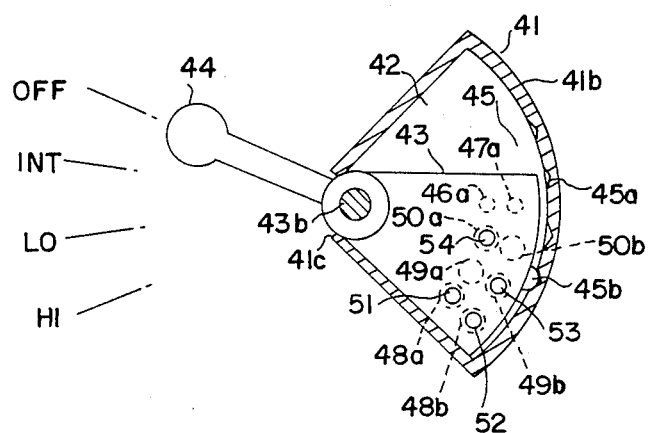
FIG. 11 is a sectional view taken along line XI—XI in FIG. 10.

Fifth Embodiment (See FIGS. 10-13):

In a fifth embodiment, the invention is applied to a wiper switch for automobiles. Referring to FIGS. 10 and 11, a plastic case 41 has a sectorial underside wall 41a and a side wall 41b extending upwardly from the peripheral edge of the underside wall 41a. An opening 41c is formed at a pivot portion of the sector as shown in FIG. 11. A support opening 41d is formed at a portion of the underside wall 41a, which portion is in the vicinity of the opening 41c. Numeral 42 indicates a sectorial plastic cover which covers an upper opening of the case 41. A support slit 42a is formed at a portion of the cover 42 opposed to the support slit 41d. A plastic bracket 43 as responsive member has a sectorial configuration and a smaller area than the underside wall 41a. The bracket 43 is rotatably mounted on axes 43a and 43b formed on the pivot portion thereof and inserted into the support slits 41d and 42a. Numeral 44 indicates an operating lever as operating member, which is formed integrally with the bracket 43. The operating lever 44 projects through the opening 41c outside the case 41. The bracket 43 is moved with the operating lever 44. In the embodiment, when the operating lever 44 is operated, the bracket 43 is selectively moved from an off-position OFF to an intermittent wipe mode position INT, a low speed wipe mode position LO and a high speed wipe mode position HI. A detent mechanism 45 holds the bracket 43 at each wipe mode position. The detent mechanism 45 is composed of a portion 45a formed on an arc portion thereof, a detent ball 45b provided within a recess 43c formed in the bracket 43, and a compression spring 45c for depressing the detent ball 45b against the portion 45a.

Phototransistors 46 and 47 as light detectors are provided with optical fibers 46a and 47a respectively. The distal edge surface of each optical fiber serves as a light detecting surface. The distal edge of each optical fiber inserted through the underside wall 41a of the case 41 so that the distal edge surface of each optical fiber is opposed to a movement locus of the bracket 43. Three pairs of fluorescent substance locating portions 48a and 48b, 49a and 49b, 50a and 50b are provided on the under surface of the bracket 43. When the bracket 43 is positioned at each of the mode positions INT, LO and HI, the fluorescent substance locating portions are opposed to the distal edge surfaces of the optical fibers 46a and 47a. The fluorescent substance locating portions are shown by broken lines in FIG. 11. In the embodiment, the fluorescent substances 51–54 each constantly emitting a fluorescence in combination with a radioactive element are disposed on the fluorescent substance locating portions 48a and 48b, 49a and 49b, 50a and 50b in the following manner. When the bracket 43 is moved to the high speed wipe mode position HI, the fluorescent substances 51 and 52 are disposed on the fluorescent substance locating portions 48a and 48b respectively which are opposed to the distal edge surfaces of the optical fibers 46a and 47a. When the bracket 43 is moved to the low speed wipe mode position LO, the fluorescent substance 53 is disposed on the fluorescent substance locating portion 49a which is opposed to the distal edge surfaces of the optical fibers 46a and 47a together with the fluorescent substance locating portion 49b. When the bracket 43 is moved to the intermittent wipe mode position INT, the fluorescent substance 54 is disposed on the fluorescent substance locating portion 50b which is opposed to the distal edge surfaces of the optical fibers 46a and 47a together with the fluorescent substance locating portion 50a.

Figures 12, 13:
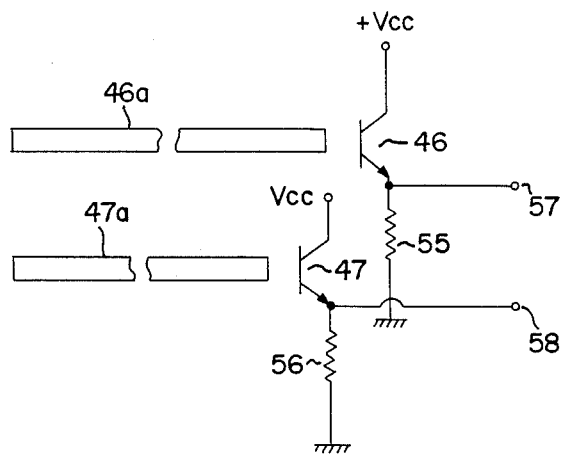
FIG. 12 is a circuit diagram for the light detector employed in the device in FIG. 10.
FIG. 13 shows code patterns of location signals employed in the device in FIG. 10.

FIG. 12 shows a circuit arrangement for obtaining a switching output in accordance with the photo reception of the phototransistors 46 and 47. A collector of each phototransistor is connected to a power-supply terminal +Vcc and an emitter of each phototransistor is grounded through each of resistances 55 and 56. Output signals are supplied from output terminals 57 and 58 connected to the emitters of the phototransistors 46 and 47 respectively in the following manner. When the bracket 43 is positioned at the off-position OFF, the fluorescent substances are not opposed to the distal edge surfaces of the optical fibers 46a and 47a. Accordingly, since the phototransistors 46 and 47 are turned off, logic level "0" signals are supplied from the output terminals 57 and 58 respectively. When the bracket is moved from the off-position OFF to the intermittent wipe mode position INT, the fluorescent substance 54 are opposed to the distal edge surface of the optical fiber 46a. The phototransistor 46 detects the fluorescence from the fluorescent substance 54 to be thereby turned on. The logic level "1" signal is supplied from the output terminal 57 in accordance with a voltage level at the power-supply terminal +Vcc and the logic level "0" signal is supplied from the output terminal 58. When the bracket 43 is moved to the low wipe mode position LO, the fluorescent substance 53 is opposed to the distal edge surface of the optical fiber 47a. Since the phototransistor 47 is turned on, the logic level "1" signal is supplied from the output terminal 58 and the logic level "0" signal is supplied from the output terminal 57. When the bracket 43 is moved to the high speed wipe mode position HI, the fluorescent substances 51 and 52 are opposed to the distal edge surfaces of the optical fibers 46a and 47a. Accordingly, since the photo-transistors 46 and 47 are turned on, the logic level "1" signals are supplied from the output terminals 57 and 58 respectively. That is, codified switching signals are supplied from the output terminals 57 and 58 in accordance with the location of the bracket 43 as shown in FIG. 13, thereby controlling operation of wipers.

In the above-described wiper switch device, since switch contacts are not employed, the life of the device is not shortened owing to wear of the contacts. Although three mode positions INT, LO and HI are provided other than the off-position, only two phototransistors are employed, thereby the number of wires for signal output is decreased. Furthermore, since each of the fluorescent substances 51–54 has a small thickness, the switch device is rendered small-sized and thinner. Additionally, since the fluorescent substances each constantly emitting a fluorescence are employed as the light sources, electric power consumption is reduced when the switch device of this embodiment is compared with the prior art wiper switch devices wherein the light-emitting diode is employed as the light source. Although the phototransistors 46 and 47 are provided with the optical fibers 46a and 47a respectively in the above-described embodiment, the optical fibers may be eliminated.

The foregoing disclosure and drawings are merely illustrative of the principles of this invention and are not to be interpreted in a limiting sense. The only limitation is to be determined from the scope of the appended claims.

What is claimed is:
1. An optical switch device comprising:
(a) a fluorescent substance constantly emitting a fluorescence in combination with a radioactive element;
(b) a light detector disposed in opposite relation to said fluorescent substance for detecting the fluorescence emitted from said fluorescent substance, said light detector generating a switching signal when detecting the fluorescence emitted from said fluorescent substance; and
(c) a manually operable shutter member provided between said fluorescent substance and said light detector so that the fluorescence emitted from said fluorescent substance is allowed to impinge on said light detector while said shutter member is being manually operated.

* * * * *